United States Patent [19]

Ruidisch et al.

[11] 4,277,334

[45] Jul. 7, 1981

[54] OIL AND DEBRIS SKIMMER

[75] Inventors: Louis E. Ruidisch, Fishkill; Sterling O. Van Wagenen, Wappingers Falls, both of N.Y.

[73] Assignee: Texaco Inc., White Plains, N.Y.

[21] Appl. No.: 120,583

[22] Filed: Feb. 11, 1980

[51] Int. Cl.³ .............................................. B01D 35/08
[52] U.S. Cl. .................................... 210/154; 210/170; 210/525; 210/242.1
[58] Field of Search ............... 210/525, 242, 170, 153, 210/154, 155, 156, 160, 162

[56] References Cited

U.S. PATENT DOCUMENTS

| | | | |
|---|---|---|---|
| 2,337,859 | 12/1943 | Styller | 210/525 |
| 2,356,469 | 8/1944 | Pearson | 210/153 |
| 2,608,300 | 8/1952 | Small | 210/DIG. 25 |
| 3,465,882 | 9/1969 | Bowersox | 210/154 |
| 3,651,943 | 3/1972 | Di Pema | 210/DIG. 25 |
| 3,752,317 | 8/1973 | Lithen | 210/DIG. 25 |
| 3,815,742 | 6/1974 | Dubouchet | 210/154 |
| 4,081,374 | 3/1978 | Tolshee | 210/162 |

Primary Examiner—Theodore A. Granger
Attorney, Agent, or Firm—Carl G. Ries; Robert A. Kulason; Henry C. Dearborn

[57] ABSTRACT

An oil skimmer in combination with a channel that directs the flow of waste water from surface drainage, or the like. There is a weir at the downstream end of the channel to maintain the level of the waste water in the channel. A pivotally supported tray goes across the channel and is mounted so that it has a normal attitude parallel to and beneath the surface of the channel water. This tray has an open end on the upstream side, and there is a means for periodically tipping it so as to wash any floating oil and debris back to the opposite end of the tray where it may be removed.

1 Claim, 4 Drawing Figures

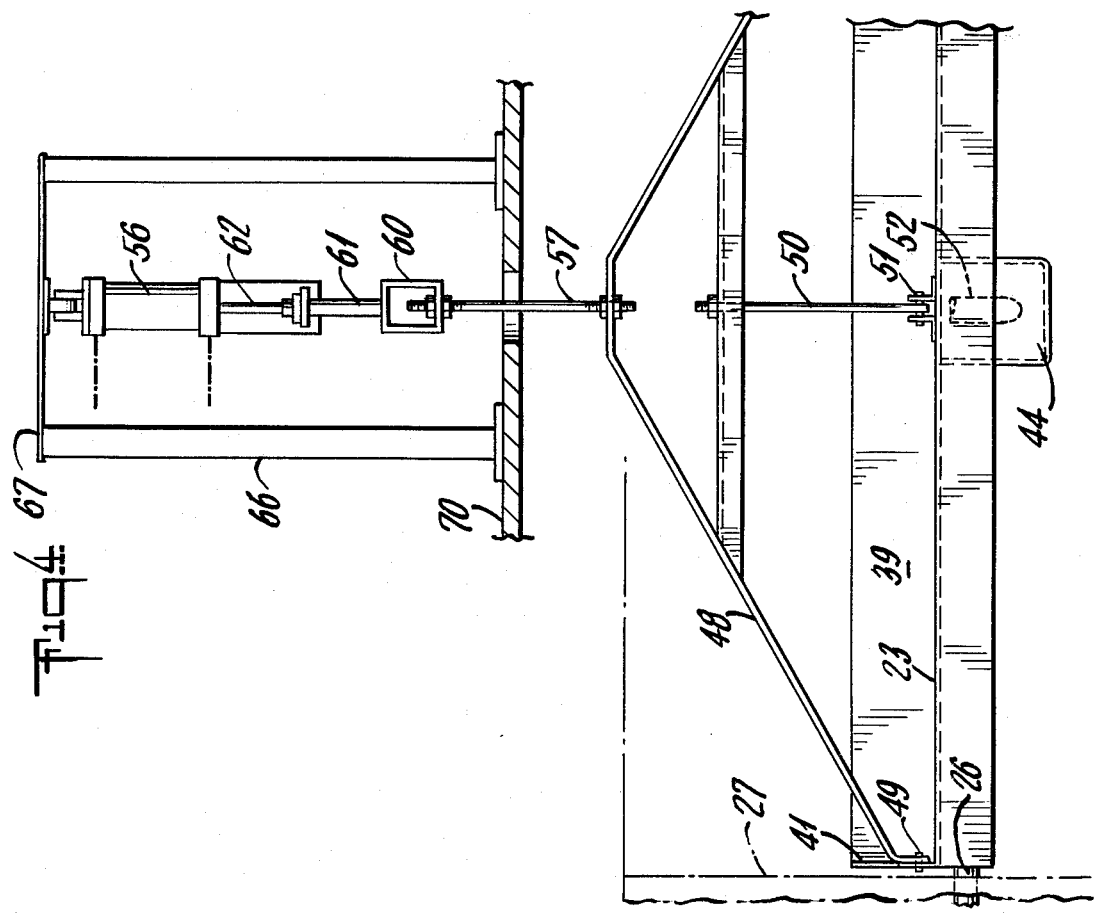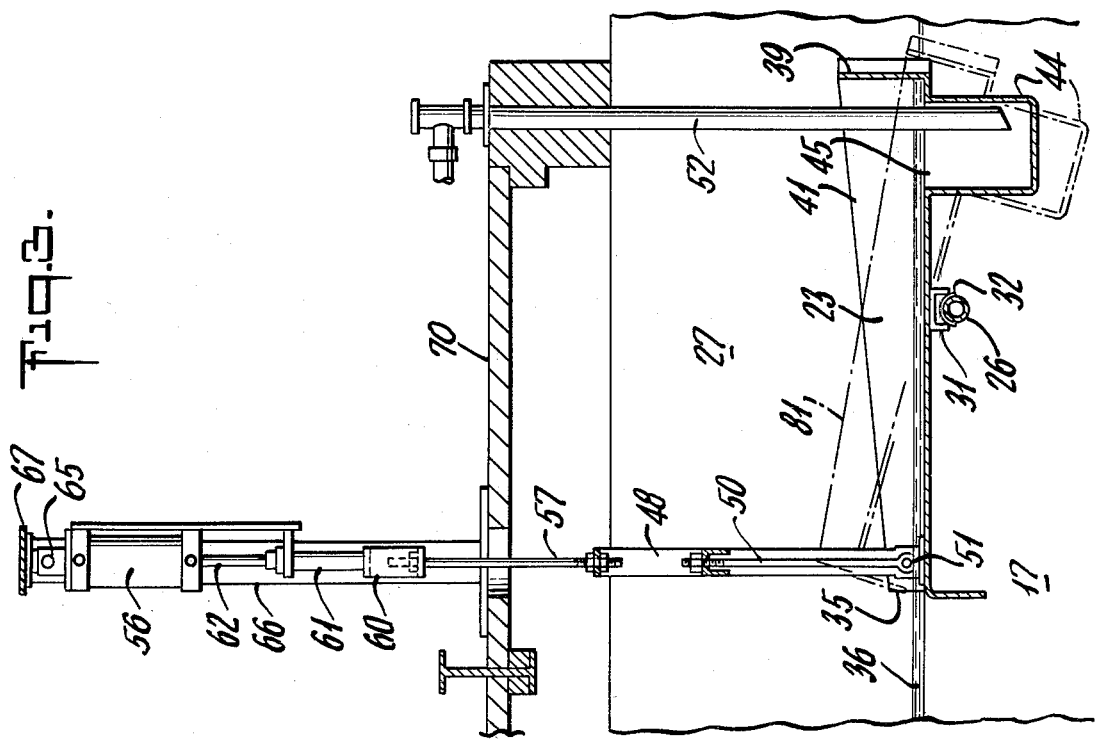

OIL AND DEBRIS SKIMMER

BACKGROUND OF THE INVENTION

1. Field of the Invention

This invention concerns apparatus for skimming light fluids such as oil and floating debris from the surface of a stream of water or the like. More specifically, it concerns a combination that involves an automatic operation for skimming from a flowing channel of water, with periodic removal of oil and debris.

2. Description of the Prior Art

Heretofore, there have been suggestions for apparatus to accomplish skimming of floating debris, oil or the like from a stream of water. For example, there is a U.S. Pat. No. 3,465,882 to Bowersox, issued Sept. 9, 1969, and another U.S. Pat., No. 3,815,742 to Dubouchet, issued June 11, 1974. However, the Bowersox patent involves a static type of scooping action which relies only on the flowing stream of water to cause the skimming action. On the other hand, the Dubouchet patent employs a complex arrangement of side streams, or sluices, for diverting the floating oil into another separate flow system. There the removal may take place. It is clearly a relatively expensive structural system.

It is an object of this invention to provide a dynamic system for making periodic removals of the floating oil and debris from a floating channel containing same.

SUMMARY OF THE INVENTION

Briefly, the invention relates to an automatic oil and debris skimmer. It comprises in combination a channel for directing contaminated water for separation of said floating oil and debris, and a weir at the downstream end of said channel for maintaining a predetermined depth therein. It also comprises a tray pivotally supported across said channel upstream from said weir, the said tray has an open end at the upstream side. It also comprises means for mounting said tray in a normal attitude parallel to and beneath the surface of said contaminated water in said channel for skimming said floating oil and debris, and means for periodically tipping said tray about its pivots to wash said floating oil and debris away from said open end to facilitate removal therefrom.

Once more briefly, the invention concerns an automatic oil and debris skimmer which comprises in combination a rectangular channel for directing the flow of contaminated water for separation of said floating oil and debris. It also comprises a weir at the downstream end of said channel for maintaining a predetermined depth therein, and a tray pivotally supported transversely relative to said channel and located adjacent to but upstream from said weir. The said tray has a open end at the upstream side and said pivotal support is centrally located between said open end and the opposite end thereof. The said tray also has a well adjacent to said opposite end for receiving said floating oil and debris when tipped about said pivotal support. The skimmer also comprises means for mounting said tray in a normal attitude parallel to and beneath the surface of said contaminated water in said channel for skimming said floating oil and debris as said water flows toward said weir, and a yoke pivotally attached to said tray adjacent to said open end. It also comprises a reciprocating piston mounted above said channel and attached to said yoke for periodically raising said yoke to tip said tray about its pivotal support to wash said skimmed oil and debris into said well, and a suction pipe extending into said well for removing said oil and debris. It also comprises a baffle between said tray and said weir for retaining any debris which may pass downstream of said tray.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 3 is an additionally enlarged partial vertical cross-section of a skimmer tray and its supports, showing in greater detail some of the elements illustrated in FIG. 2; and FIG. 4 is a partial transverse cross-section of the same elements illustrated in FIG. 3 and enlarged to about the scale.

DESCRIPTION OF THE PREFERRED EMBODIMENT

Figure 1:
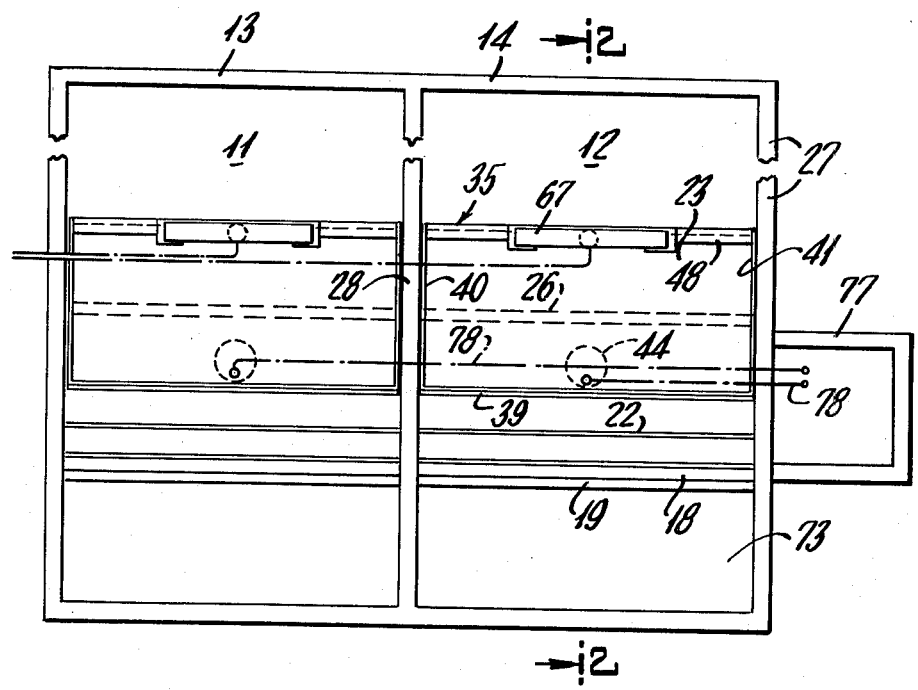
FIG. 1 is a schematic shortened plan view illustrating a pair of skimmers according to the invention, mounted side by side for alternate operation.

Heretofore, an oil/water separator system has been employed and was expected to make a clean cut or separation between oil and water. However, such system has been found to involve accummulations of algae floats and wind blown leaves which have created problems that make trouble free operation difficult. A trouble free dynamic system has been invented in accordance with this application, and the various elements of the combination are illustrated in the drawings.

Referring to FIG. 1, it will be observed that there is a plan view illustrating a pair of channels 11 and 12, situated side by side. These channels 11 and 12 may be arranged to receive drainage waters from surface drains and the like, in an alternate fashion at the upstream ends 13 and 14, respectively. It will be understood that by having two of these identical channels 11 and 12 situated side by side, they may be employed in alternation, but the skimmer elements employed in each are substantially identical. Consequently, only one channel with the skimmer elements involved therewith, need be described in detail.

Figure 2:
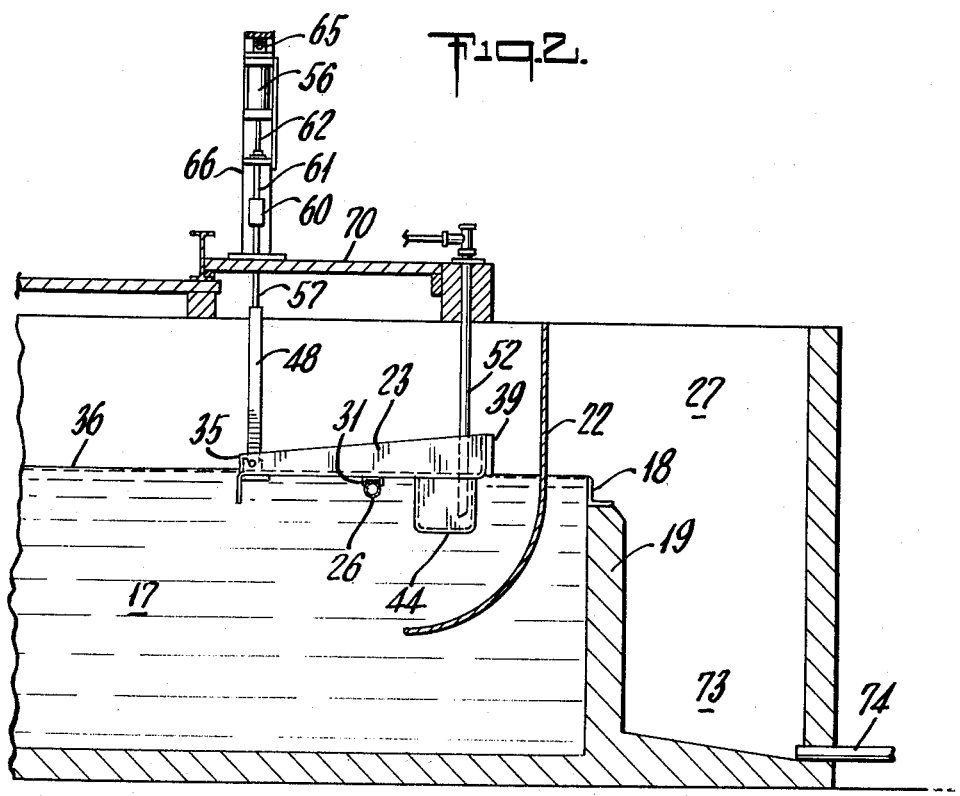
FIG. 2 is an enlarged partial vertical cross-section view taken along the lines 2—2 of FIG. 1.

With reference to FIG. 2, it will be observed that there is a body of contaminated water 17 flowing in the channel 12. It flows from left to right (as viewed in FIG. 2) with the liquid level of the water 17 being maintained by a weir 18 which is mounted at the top of a wall or dam 19.

Shortly upstream from the weir 18 there is a baffle 22 that extends down into the body of water 17 and acts to retain any debris which may pass downstream of a skimming tray 23. This tray 23 is pivotally supported across the channel 12 in a transverse manner. The pivot may, of course, take various forms, but in the structure illustrated it consists of a transverse pipe or shaft 26 that extends into side walls 27 and 28 which form the side walls of the channel 12.

Pivoting action of the tray 23 may be arranged in any feasible manner, for example as shown in some detail in FIG. 3. There is a transversely situated channel member 31 that is securely attached to the bottom of the tray 23. The channel 31 has a half sleeve 32 attached for movement therewith. The attachment may be made by any feasible arrangement such as welding or the like. Thus the half sleeve 32 will rotatably slide over the surface of the pipe 26 as the tray 23 pivots about the axis of pipe 26.

The tray 23 has an open end 35. That end of tray 23 is situated upstream in the body of water 17. Consequently, in the normal attitude of the tray 23, any floating oil and debris forms a surface layer 36 on the water 17. This surface layer 36 tends to flow into the tray 23 which is mounted so as to have a normal attitude parallel to and beneath the surface 36. Also, tray 23 has an end wall 39 located opposite to the open end 35. It joins a pair of side walls 40 and 41 so as to contain the oil and debris which has entered into the tray during the skimming action.

There is a well 44 that is attached to the tray 23 near the opposite end from the open end 35, so as to receive the oil and debris which has been skimmed. The well 44 has an open top 45 to permit the oil and debris that is washed back in the tray to enter the well 44.

The tray 23 is normally mounted in the position illustrated in FIG. 2 and in FIG. 3 in full lines, so that the bottom of the tray is located a short distance beneath the surface of the water 17 and is substantially parallel thereto. This mounting is of course accomplished by the location of the pipe 26 which is transverse to the channel 12 and body of water 17 therein. It is located at the desired height relative to the weir 18 which determines the level of the water 17.

There is a yoke 48 that is pivotally attached to the side walls 40 and 41 near the open end 35 of the tray 23. Such pivots may be accomplished in any feasible manner, e.g. by having a pin 49 (FIG. 4) which goes through a hole in the lower end of the yoke 48 and fastens to the side wall 41 of the tray 23. Of course, the same type pivot arrangement (not shown) is employed at the other side of the yoke 48, and there is a central support rod 50 that is part of the structure of the yoke 48, which rod 50 has a pivotal connection 51 to the tray 23.

There is a suction pipe 52 that is mounted so as to extend into the well 44 near the bottom thereof. This is for removing the accummulated oil and debris following tipping action which will be described below.

There is a reciprocating cylinder-and-piston 56 that is mounted above, and attached to the yoke 48 in any feasible manner. For example, there is a rod 57 that is bolted onto the yoke 48 at the lower end of the rod 57. The upper end of the rod 57 bolts onto a coupler 60 that is carried by the lower end of a connector 61 which is attached to the lower end of a piston rod 62. The cylinder-and-piston 56 has its upper end attached for pivotal movement about a pivot pin 65.

The cylinder-and-piston 56 and its coupling elements that connect it to the yoke 48, are all mounted above the channel 12. As indicated in FIGS. 3 and 4, such mounting involves a standard 66 which is made up of two legs and a top cross member 67. The legs of the standard 66 are supported on a platform 70 that is built over the end of the channel 12, and is just upstream from the weir 18 and dam 19.

There is a chamber 73 at the end of the channel 12, which receives the overflow of the water 17 after it has passed the skimming tray 23. The water which collects in the chamber 73 may be withdrawn for a final cleaning process, if desired, by flowing it out through a pipe 74.

It is contemplated that operation of the skimming procedure according to the invention is readily adaptable to providing alternative systems by using two identical combinations of apparatus in accordance with the one described above. Thus, as indicated in FIG. 1, there is a combination of elements in channel 11 which is identical to the elements in channel 12 which were described above. The operation involves a control arrangement (not shown) that may be contained in an adjacent structure 77. It will be appreciated that the particular type of control arrangement might vary, i.e. it might be hydraulic or pneumatic, and the control lines for actuating the cylinder-and-pistons 56 are indicated schematically by a pair of dashed lines 78.

OPERATIONS

The operation of the system includes a periodic tipping of the tray 23 after the skimming action has had time to take effect, i.e. so that the oil and debris will have had time to flow into the tray 23. While it will be appreciated that the tipping action might be carried out manually, it is preferred to have the cylinder-and-piston 56 actuated from a time control (not shown), so that at given intervals in a continuous manner the tray 23 will be tipped from the position illustrated in full lines in FIG. 3, to the position indicated by dashed lines 81. Such tipping action will cause the oil and debris that has been skimmed off into the tray, to be washed back to the back and so into the well 44.

Thereafter, the collected oil and debris may be pumped out of the well 44 by suction through the pipe 52. This is done using an adequate pumping arrangement (not shown) to dispose of the waste material.

The whole arrangement may, of course, be set up with continuous timing controls so arranged that the tipping actions will take place at any desired periodic intervals in a continuous manner. And, as indicated above, it may be preferable to have the operations alternate between the two channels 11 and 12 so that each one can accummulate the skimmed material for some time while the other is being tipped and cleaned out.

While a particular embodiment of the invention has been described above in considerable detail in accordance with the applicable statutes, this is not to be taken as in any way limiting the invention, but merely as being descriptive thereof.

We claim:

1. An automatic oil and debris skimmer, comprising in combination
    a rectangular channel for directing the flow of contaminated water for separation of said floating oil and debris,
    a weir at the downstream end of said channel for maintaining a predetermined depth therein,
    a tray pivotally supported transversely relative to said channel and located adjacent to but upstream from said weir,
    said tray having an open end at the upstream side and said pivotal support being centrally located between said open end and the opposite end thereof,
    said tray also having a well adjacent to said opposite end for receiving said floating oil and debris when tipped about said pivotal support,
    means for mounting said tray in a normal attitude parallel to and beneath the surface of said contaminated water in said channel for skimming said floating oil and debris as said water flows toward said weir, a yoke pivotally attached to said tray adjacent to said open end, a reciprocating piston mounted above said channel and attached to said yoke for periodically raising said yoke to tip said tray about its pivotal support to wash said skimmed oil and debris into said well, a suction pipe extending into said well for removing said oil and debris, and a baffle between said tray and said weir for retaining any debris which may pass downstream of said tray.

* * * * *